US012776701B2

(12) United States Patent
Yu et al.

(10) Patent No.: US 12,776,701 B2
(45) Date of Patent: Oct. 27, 2026

(54) HARMONIC SUPPRESSION METHOD AND APPARATUS FOR THREE-PHASE THREE-WIRE CASCADED POWER CONVERSION APPARATUS

(71) Applicant: EATON INTELLIGENT POWER LIMITED, Dublin (IE)

(72) Inventors: Jianxiong Yu, Shanghai (CN); Jiajie Duan, Shanghai (CN); Cheng Luo, Shanghai (CN); Cheng Wang, Shanghai (CN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 247 days.

(21) Appl. No.: 18/795,941

(22) Filed: Aug. 6, 2024

(65) Prior Publication Data

US 2025/0070647 A1 Feb. 27, 2025

(30) Foreign Application Priority Data

Aug. 23, 2023 (CN) ........................ 202311071324.X

(51) Int. Cl.
*H02M 1/00* (2007.01)
*H02M 1/12* (2006.01)
(Continued)

(52) U.S. Cl.
CPC ............ *H02M 1/12* (2013.01); *H02M 1/007* (2021.05); *H02M 1/143* (2013.01); *H02M 7/219* (2013.01)

(58) Field of Classification Search
CPC ...... H02M 7/219; H02M 7/217; H02M 7/483; H02M 7/5387; H02M 7/53871;
(Continued)

(56) References Cited

U.S. PATENT DOCUMENTS

2023/0223861 A1* 7/2023 Everts ........................ H02J 7/02 363/125

* cited by examiner

*Primary Examiner* — Bryan R Perez
(74) *Attorney, Agent, or Firm* — Stanek Lemon Crouse & Meeks, PA

(57) ABSTRACT

A harmonic suppression method and apparatus for a three-phase three-wire cascaded power conversion apparatus is disclosed. The method can include: calculating a first current output from a full-bridge rectifier module to a floating direct current side, the first current being composed of a first current direct current component and a first current double frequency component; and generating a first injection voltage with a triple frequency, so as to inject the first injection voltage into the floating direct current side and transfer at least a portion of the first current double frequency component to a low-voltage direct current side, where total current on the floating direct current side is composed of the first current and a second current after the first injection voltage is injected, the second current is composed of a second current double frequency component and a second current quadruple frequency component, and the amplitude and the phase angle of the first injection voltage are configured so that the first and second current double frequency components are at least partially canceled. The method reduces the demand for capacitance on the floating direct current side of the power conversion apparatus, resulting in a significant increase in power density and high power conversion efficiency.

20 Claims, 4 Drawing Sheets

(51) Int. Cl.
*H02M 1/14* (2006.01)
*H02M 7/219* (2006.01)

(58) Field of Classification Search
CPC ............ H02M 7/10; H02M 7/49; H02M 7/04; H02M 1/12; H02M 1/42; H02M 1/15; H02M 1/4225; H02M 1/14; H02M 1/4233; H02M 1/007; H02M 1/4208; H02M 1/08; H02M 1/0009; H02M 1/10; H02M 1/4241; H02M 1/32
See application file for complete search history.

HARMONIC SUPPRESSION METHOD AND APPARATUS FOR THREE-PHASE THREE-WIRE CASCADED POWER CONVERSION APPARATUS

CROSS-REFERENCE TO RELATED APPLICATIONS

This application claims the benefit of foreign priority to Chinese Patent Application No. 202311071324.X, filed on Aug. 23, 2023, the disclosure of which is hereby incorporated herein by reference.

TECHNICAL FIELD

The present invention relates to the field of power management and control, specifically to a harmonic suppression method and apparatus for a three-phase three-wire cascaded power conversion apparatus.

BACKGROUND

A cascaded H-bridge power conversion apparatus using a modular cascaded topology is used for converting power of a medium-voltage grid into direct current power on a low-voltage direct current side. The cascaded H-bridge power conversion apparatus not only has the characteristics of high power density and small size, but also has outstanding advantages such as multiple levels, good harmonic characteristics, and fast adjustment speed, making it very suitable for application in ultra-large-scale power supply.

FIG. 1 illustrates a schematic diagram of a topological structure of a modular cascaded H-bridge power conversion apparatus. Each of R, S, and T phases of the cascaded H-bridge power conversion apparatus has the same structure. The structure of any stage of each phase mainly includes a rectifier module (left AC/DC in FIG. 1) for receiving alternating current voltage from a medium-voltage grid side, a floating direct current side for receiving rectified power output by the H-bridge rectifier module, and a dual active bridge (D-AB) module (including middle DC/AC, an isolation transformer, and right AC/DC in FIG. 1) for isolating and converting power on the floating direct current side to a low-voltage direct current side on the right of FIG. 1. The full-bridge rectifier modules of all stages of each phase are sequentially connected in series at their input ends, and all dual active bridge modules of the three phases, except for bypass stages, are connected in parallel on the low-voltage direct current side. Typically, the voltage on a medium-voltage alternating current input side is about 10 KV alternating current voltage, the voltage on the floating direct current side is about 9600 V direct current voltage, and the voltage on the low-voltage direct current side is significantly reduced to 800 V direct current voltage. Therefore, it is convenient for the cascaded H-bridge power conversion apparatus to convert the power of the medium-voltage grid to the low-voltage direct current side and invert it to output to a load. In order to illustrate the circuit connection relationship of the cascaded H-bridge power conversion apparatus more clearly, FIG. 1 does not show circuit modules connected to the low-voltage direct current side, such as a DC/AC inverter portion, the load, a control apparatus, and a detection apparatus for detecting voltage.

The cascaded H-bridge power conversion apparatus in existing technologies has voltage harmonics of more than two orders on the floating direct current side, which must be eliminated before entering an alternating current input grid. Therefore, the floating direct current side is usually equipped with a capacitor (not shown in FIG. 1), the capacitance of which depends on the scale level of high-order voltage harmonics. The capacitor must be arranged in each stage, resulting in low power density and the large volume of existing cascaded H-bridge power conversion apparatuses.

SUMMARY

In view of the above problems in the existing technologies, a first aspect of the present invention provides a method for controlling a three-phase three-wire cascaded H-bridge power conversion apparatus, the cascaded H-bridge power conversion apparatus having a plurality of stages with the same structure, each stage including a full-bridge rectifier module, a floating direct current side, a dual active bridge converter, and a low-voltage direct current side connected in sequence, where a capacitor is connected in parallel to the floating direct current side, the full-bridge rectifier module rectifies an alternating current input voltage with a fundamental frequency into a direct current voltage and outputs the direct current voltage to the floating direct current side, and the dual active bridge converter receives and converts the direct current voltage and outputs the converted voltage to the low-voltage direct current side.

The method includes:

calculating a first current output from the full-bridge rectifier module to the floating direct current side when the dual active bridge converter performs direct current-direct current conversion, the first current being composed of a first current direct current component and a first current double frequency component; and generating a first injection voltage with a triple frequency of the fundamental frequency, so as to inject the first injection voltage into the floating direct current side and transfer at least a portion of the first current double frequency component to the low-voltage direct current side, and wherein:

total current on the floating direct current side is composed of the first current and a second current after the first injection voltage is injected, where the second current is composed of a second current double frequency component and a second current quadruple frequency component, and wherein the amplitude and phase angle of the first injection voltage are configured so that the first current double frequency component and the second current double frequency component are at least partially canceled.

Preferably, in the method for controlling the three-phase three-wire cascaded H-bridge power conversion apparatus, when the first injection voltage is not injected, the voltage of the full-bridge rectifier module is represented as:

$$U'_{in} = U_f U_{dc} \sin(\omega t).$$

The first injection voltage is represented as:

$$U_{inj-3rd} \sin(3\omega t) = U_{3rd} U_{dc} \sin(3\omega t),$$

when the first injection voltage is injected, the voltage of the full-bridge rectifier module is represented as:

$$U_{in} = U'_{in} + U_{inj-3rd}\sin(3\omega t) = U_f U_{dc}\sin(\omega t) + U_{3rd}U_{dc}\sin(3\omega t),$$

where $U_f$ is a conversion coefficient of the full-bridge rectifier module, $U_{dc}$ is a voltage on the floating direct current side, ω is an alternating current input frequency, and where the amplitude of the first injection voltage is configured to satisfy the following first reference wave amplitude constraint to avoid waveform distortion of the full-bridge rectifier module when injecting the first injection voltage:

$$|U_f\sin(\omega t) + U_{3rd}\sin(3\omega t)| \leq 1.$$

Preferably, in the method for controlling the three-phase three-wire cascaded H-bridge power conversion apparatus, the single-phase alternating current input current is $I_m$ sin (ωt), and the total current on the floating direct current side when the first injection voltage is injected is represented as:

$$I_{dc} = \frac{U_f I_m}{2} + A\frac{\cos(2\omega t)I_m}{2} + B\frac{\cos(4\omega t)I_m}{2},$$

wherein $A=-(U_f-U_{3rd})$, $B=-U_{3rd}$, and the amplitude of the first injection voltage is configured to minimize $\sqrt{A^2+B^2}$ while satisfying the first reference wave amplitude constraint.

Preferably, in the method for controlling the three-phase three-wire cascaded H-bridge power conversion apparatus, the first injection voltage is configured to satisfy:

$$U_{3rd} = U_f/2.$$

Preferably, each phase of the three-phase three-wire cascaded H-bridge power conversion apparatus includes at least one bypass stage and one redundant stage. The method further includes: for each phase, generating, in addition to the first injection voltage, a second injection voltage with a quintuple frequency of the fundamental frequency and a third injection voltage with the same frequency but opposite phase as the second injection voltage; controlling the full-bridge rectifier module to superimpose the second injection voltage, the alternating current input voltage, and the first injection voltage and output the superimposed voltage to the floating direct current side of the redundant stage, wherein the total current on the floating direct current side is composed of the first current, the second current, and a third current after the first and second injection voltages are injected, where the third current is composed of a third current quadruple frequency component and a third current sextuple frequency component, and wherein the amplitude and phase angle of the second injection voltage are configured so that the second current quadruple frequency component and the third current quadruple frequency component are at least partially canceled; and controlling the full-bridge rectifier module to inject the third injection voltage into the floating direct current side of the bypass stage.

Preferably, in the method for controlling the three-phase three-wire cascaded H-bridge power conversion apparatus, when the first injection voltage is not injected, the voltage of the full-bridge rectifier module is represented as:

$$U_{in} = U_f U_{dc}\sin(\omega t).$$

The first injection voltage is represented as:

$$U_{inj-3rd}\sin(3\omega t) = U_{3rd}U_{dc}\sin(3\omega t),$$

and the second injection voltage is represented as:

$$U_{inj-5th}\sin(5\omega t) = U_{5th}U_{dc}\sin(5\omega t),$$

wherein $U_f$ is the conversion coefficient of the full-bridge rectifier module, $U_{dc}$ is the voltage on the floating direct current side, ω is the alternating current input frequency, and where the amplitudes of the first and second injection voltages are configured to satisfy the following second reference wave amplitude constraint to reduce waveform distortion of the full-bridge rectifier module when injecting the first and second injection voltages:

$$|U_f\sin(\omega t) + U_{3rd}\sin(3\omega t) + U_{5th}\sin(5\omega t)| \leq 1.$$

Preferably, in the method for controlling the three-phase three-wire cascaded H-bridge power conversion apparatus, the single-phase alternating current input current is represented as $I_m$ sin(ωt), and the total current on the floating direct current side when the first injection voltage is injected is represented as:

$$I_{dc} = \frac{U_f I_m}{2} + A\frac{\cos(2\omega t)I_m}{2} + B\frac{\cos(4\omega t)I_m}{2} + C\frac{\cos(6\omega t)I_m}{2},$$

wherein $A=-(U_f-U_{3rd})$, $B=-(U_{3rd}-U_{5th})$, $C=-U_{5th}$, and the first and second injection voltages are configured to minimize $\sqrt{A^2+B^2+C^2}$ while satisfying the second reference wave amplitude constraint.

Preferably, in the method for controlling the three-phase three-wire cascaded H-bridge power conversion apparatus, at least one of three phases of the cascaded H-bridge power conversion apparatus includes a redundant stage. And the method further includes: after replacing other stages except for the redundant stage, controlling the redundant stage to inject injection voltages with triple and quintuple frequencies of alternating current input, and controlling the other stages to inject the injection voltage with the triple frequency of the alternating current input.

Preferably, in the method for controlling the three-phase three-wire cascaded H-bridge power conversion apparatus, at least 90% of the first current double frequency component is transferred to the low-voltage direct current side by the dual active bridge converter; or all of the first current double frequency component is transferred to the low-voltage direct current side by the dual active bridge converter, so that only the direct current component is retained on the floating direct current side.

Preferably, in the method for controlling the three-phase three-wire cascaded H-bridge power conversion apparatus, the amplitude and phase angle of the first injection voltage are configured so that all the first and second double frequency current components are canceled.

Another aspect of the present invention provides a three-phase three-wire cascaded H-bridge power conversion apparatus configured to implement the control method described in the first aspect of the present invention.

Preferably, each phase of the three-phase three-wire cascaded H-bridge power conversion apparatus includes at least one bypass stage and one redundant stage. The method further includes: for each phase, generating, in addition to the first injection voltage, a second injection voltage with a quintuple frequency of the fundamental frequency and a third injection voltage with the same frequency but opposite phase; controlling the full-bridge rectifier module to superimpose the second injection voltage, the alternating current input voltage, and the first injection voltage and output the three to the floating direct current side of the redundant stage, where the total current on the floating direct current side is composed of the first current, the second current, and a third current after the first and second injection voltages are injected, where the third current is composed of a third current quadruple frequency component and a third current sextuple frequency component, and where an amplitude and a phase angle of the second injection voltage are configured so that the second current quadruple frequency component and the third current quadruple frequency component are at least partially canceled; and controlling the full-bridge rectifier module to inject the third injection voltage into the floating direct current side of the bypass stage. The redundant stage and the bypass stage are configured as follows: when the total working time of the redundant stage after leaving the factory is greater than that of other stages in the phase, the first injection voltage is injected into the full-bridge rectifier modules of the other stages except for the redundant stage, and the first and second injection voltages are injected into the full-bridge rectifier module of the redundant stage, and the third injection voltage is injected into the full-bridge rectifier module of the bypass stage, where the bypass stage does not participate in the direct current-direct current conversion from the floating direct current side to the low-voltage direct current side.

According to the present invention, the three-phase three-wire cascaded H-bridge power conversion apparatus and the control method therefor can efficiently transfer undesired ripple waves on the floating direct current side of each stage to the low-voltage direct current side for elimination, and can also ensure lower power loss of the direct current-direct current conversion unit. Therefore, the capacitance on the floating direct current side can be minimized, the power density of the three-phase three-wire cascaded H-bridge power conversion apparatus is significantly improved, with high power conversion efficiency.

The floating direct current side is usually equipped with a capacitor (not shown in FIG. 1), the capacitance of which depends on the scale level of high-order voltage harmonics. The capacitor must be arranged in each stage, resulting in low power density and large volume of existing cascaded H-bridge power conversion apparatuses.

BRIEF DESCRIPTION OF THE DRAWINGS

The following further illustrates the embodiments of the present invention with reference to the drawings.

DETAILED DESCRIPTION

Figure 1:
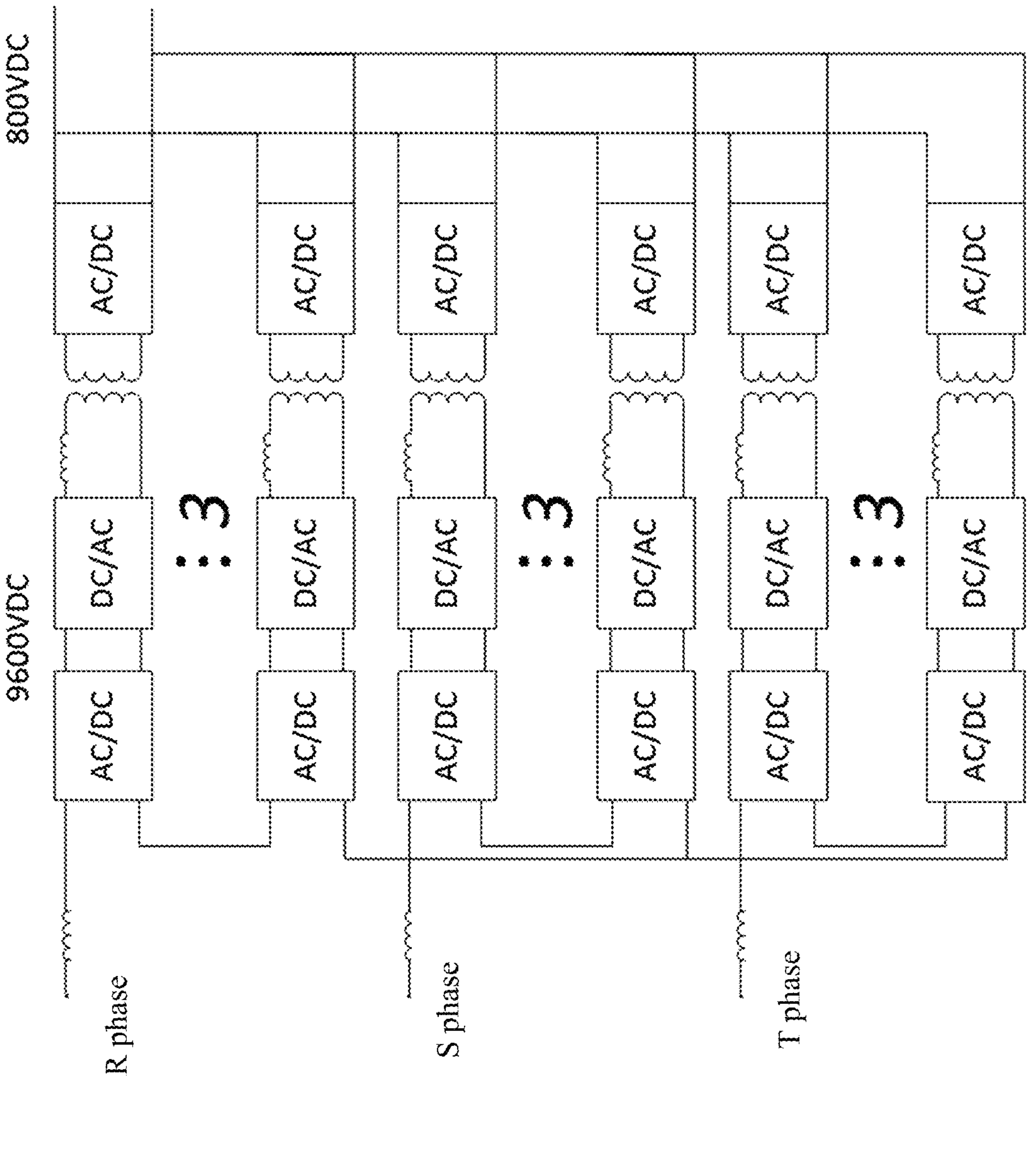
FIG. 1 illustrates a schematic diagram of a topological structure of a modular cascaded H-bridge power conversion apparatus.

In order to make the objectives, technical solutions, and advantages of the present invention clearer, the present invention will be further described in detail below in conjunction with the drawing through specific embodiments.

Figure 2:
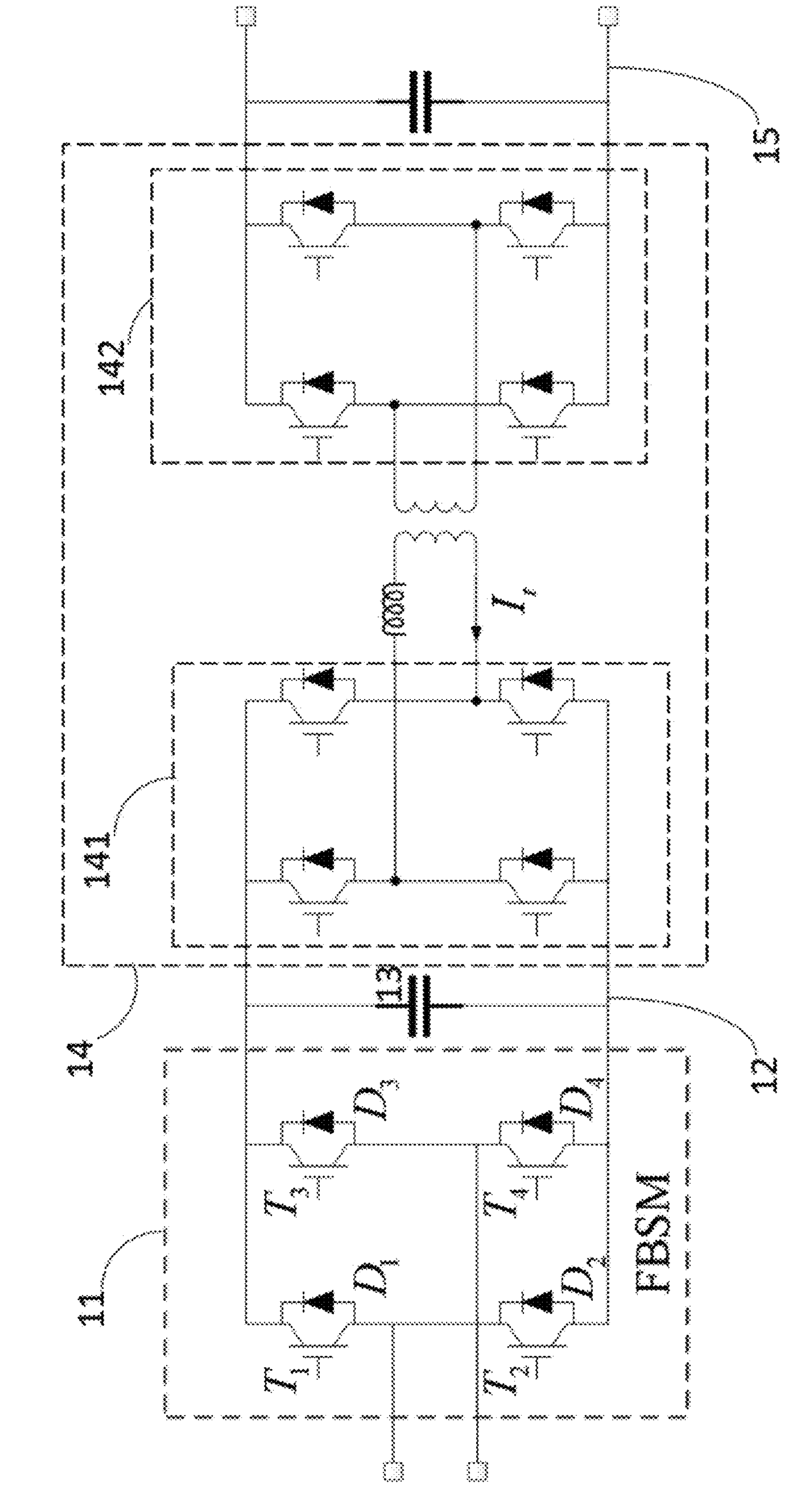
FIG. 2 illustrates one stage of one phase in the cascaded H-bridge power conversion apparatus shown in FIG. 1.

FIG. 2 illustrates one stage of one phase in the cascaded H-bridge power conversion apparatus shown in FIG. 1. As shown in FIG. 2, this stage is sequentially configured from left to right as follows: a full-bridge rectifier module 11 is configured to receive single-phase alternating current power; the full-bridge rectifier module 11 outputs power to a floating direct current side 12, where a capacitor 13 is connected in parallel to the floating direct current side; a dual active bridge module 14 includes a DC/AC module 141, an inductor, an isolation transformer, and an AC/DC module 142; and the dual active bridge module 14 outputs low-voltage direct current power after direct current-direct current conversion to a low-voltage direct current side 15.

If grid input current $I_g$ is $$I_g = I_m \sin(\omega t),$$

the voltage $U'_{in}$ in the full-bridge rectifier module is $$U'_{in} = U_m \sin(\omega t) = U_f U_{dc} \sin(\omega t),$$

the output power of the full-bridge rectifier module is $$P_{in} = I_g U'_{in} = U_f U_{dc} I_m \sin^2(\omega t),$$

and the output current of the full-bridge rectifier module is $$I_{dc} = P_{in} / U_{dc} = \frac{U_f I_m}{2} - \frac{U_f I_m}{2} \cos(2\omega t),$$

wherein, $I_{dc}$ is current output from the full-bridge rectifier module to the floating direct current side, $U_f$ is a conversion coefficient of the full-bridge rectifier module, $U_{dc}$ is the voltage at two ends of the capacitor connected in parallel to the floating direct current side, and $I_m$ is an amplitude of the alternating current input current. It can be seen that the current $I_{dc}$ output to the floating direct current side includes a direct current component $$\frac{U_f I_m}{2}$$

and a double frequency alternating current component $$-\frac{U_f I_m}{2}\cos(2\omega t).$$

Table 1 illustrates a set of typical values of the above parameters in an application.

TABLE 1

| | |
|---|---|
| $I_m$ | 162 A |
| $U_m$ | 680 V |
| $U_{dc}$ | 800 V |
| $I_{dc}$ | 70ADC + 49.5 A 100 Hz |

As previously mentioned, in order to make the waveform, output to the low-voltage direct current side, of a dual active bridge (D-AB) converter connected to the floating direct current side closer to a direct current waveform, a relatively large capacitor is usually connected in parallel to the floating direct current side to absorb the double frequency alternating current component of $I_{dc}$. However, such a layout makes the capacitance of the capacitor too large, making it difficult to reduce the volume of the cascaded H-bridge power conversion apparatus.

In the technical solution of the present application, the inventor proposes an expectation to avoid absorbing at least a portion of the double frequency alternating current component of current on the floating direct current side by the capacitor, but to transfer the double frequency alternating current component to the low-voltage direct current side for further elimination, based on the principle that double frequency waveforms can be superimposed and canceled on the low-voltage direct current side due to the phase difference 120° of double frequency waveform components of three phases in a three-phase power system, thereby reducing the pressure on the capacitor on the floating direct current side and reducing its capacitance. However, if only the double frequency alternating current components in the three phases are simply transferred to the low-voltage direct current side without waveform adjustment matching, waveform changes transferred in the dual active bridge may cause changes in losses in various switching transistors, transformers, and inductors. To find an optimal solution after combining capacitance reduction and loss control, the inventor further analyzed the loss amount of the cascaded H-bridge power conversion apparatus in various states.

Figure 3:
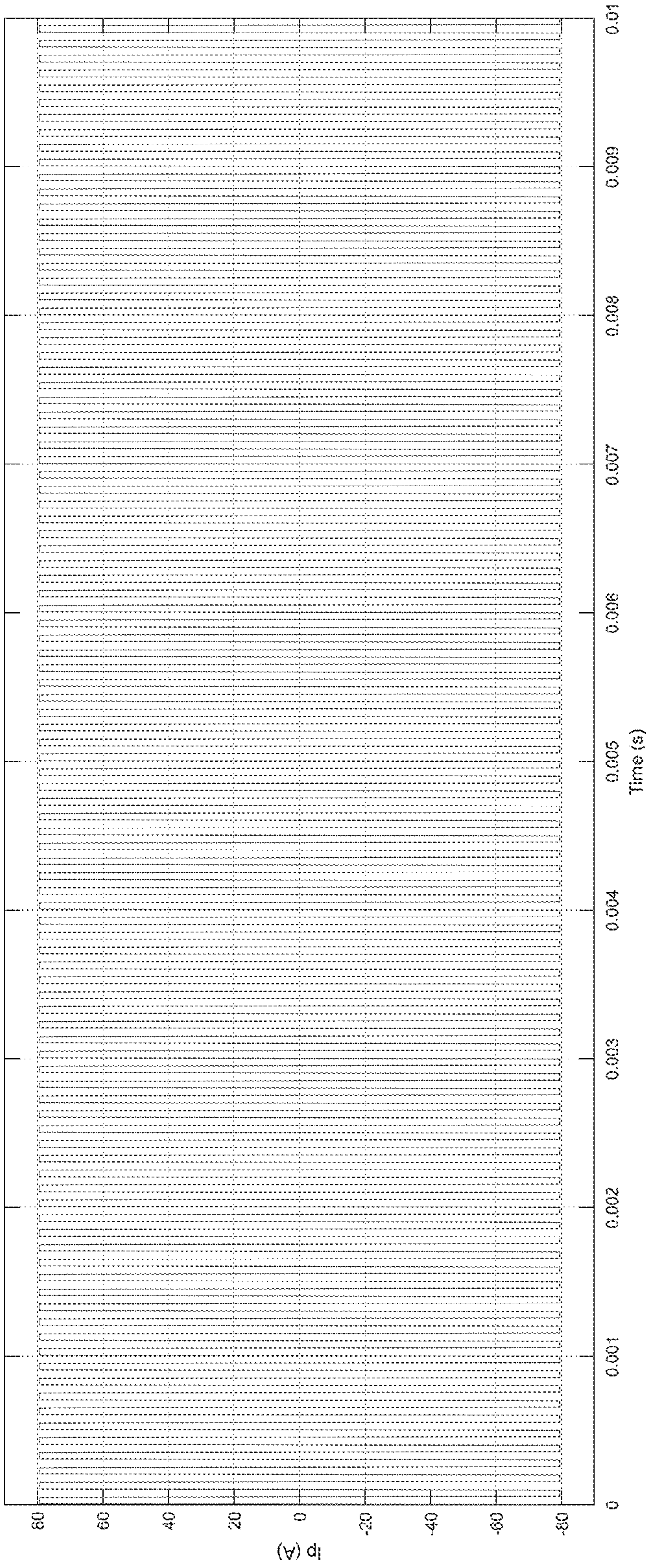
FIG. 3 illustrates a current waveform flowing through a dual active bridge (D-AB) module during direct current-direct current conversion using a pulse width modulation method in a conventional operation.

FIG. 3 illustrates a current waveform output by the dual active bridge (D-AB) module to the low-voltage direct current side during direct current-direct current conversion using a pulse width modulation method in a conventional operation. As shown in FIG. 3, due to the implementation of direct current-direct current conversion, the dual active bridge module outputs square waves with substantially the same amplitudes, and the corresponding power of current $I_p$ transferred in the dual active bridge module may be approximately considered as direct current power. The dual active bridge module includes a bridge type DC-AC module on a primary side, an inductor, an isolation transformer, and a bridge type AC-DC module on a secondary side. Therefore, switching transistors in the modules will have conduction losses and switching losses in the process of power transmission, and a primary winding and a secondary winding of the isolation transformer also have losses. Table 2 illustrates respective conduction loss, switching loss, and total loss of the DC-AC module on the primary side and the AC-DC module on the secondary side of the typical dual active bridge module under the condition of 100% load, where the total loss on the primary side is 154.84 watts, the total loss on the secondary side is 157.92 watts, and the total loss added up is 312.76 watts. The primary side and secondary side of the isolation transformer used in the test have a winding ratio of 1:1, so the losses of the windings on both sides are close to the same.

TABLE 2

| Loss on semiconductor elements in DC-DC power portion (W) | |
|---|---|
| Load | 100% |
| Conduction loss on primary side | 86.134 |
| Switching loss on primary side | 68.706 |
| Total loss on primary side | 154.84 |
| Conduction loss on secondary side | 88.93 |
| Switching loss on secondary side | 68.99 |
| Total loss on secondary side | 157.92 |
| Total loss | 312.76 |

The square wave shown in FIG. 3 can be expanded by Fourier expansion into a superposition of odd multiple frequencies of a fundamental frequency. In the Fourier expansion, the proportion of losses caused by first five square wave frequency components, namely, the fundamental frequency, triple frequency, quintuple frequency, septuple frequency, and nonuple frequency in the windings of the isolation transformer of the double active bridge is already quite high. For the sake of analysis, the sum of the losses of the odd multiple frequency components can be approximated as the total loss of the windings of the isolation transformer. In an exemplary simulation, the fundamental frequency (pulse width modulation frequency used in dual active bridge power conversion) is set to 30 KHz. Table 3 shows total losses of the windings of the isolation transformer, caused by the waveforms of the five multiple frequency components respectively, namely, the fundamental frequency (30 KHz), triple frequency (90 KHz), quintuple frequency (150 KHz), septuple frequency (210 KHz), and nonuple frequency (270 KHz), and cumulative losses of the five items. It can be seen that the total loss of the windings of the isolation transformer is about 147.75 watts.

TABLE 3

| Winding losses of medium-voltage transformer (W) | | | |
|---|---|---|---|
| Frequency | Resistance (mohm) | Current (A) | Loss (W) |
| 30 KHz | 19.5 | 71 | 98.30 |
| 90 KHz | 43.5 | 22.6 | 22.27 |
| 150 KHz | 87.7 | 12.3 | 13.27 |
| 210 KHz | 152.9 | 7.5 | 8.60 |
| 270 KHz | 240.5 | 4.7 | 5.31 |
| | Total loss (W) | | 147.75 |

After obtaining the measured energy transfer loss value of the dual active bridge module in the single stage as shown in Table 2 and Table 3, the inventor further tests the situation that the double frequency alternating current component in the current $I_{dc}$ on the floating direct current side is superimposed on the original direct current component by appropriate pulse width modulation and the both are transferred to the low-voltage direct current side together by the dual active bridge module, to obtain an energy transfer loss value of each portion of the dual active bridge module in this scenario.

Figure 4:
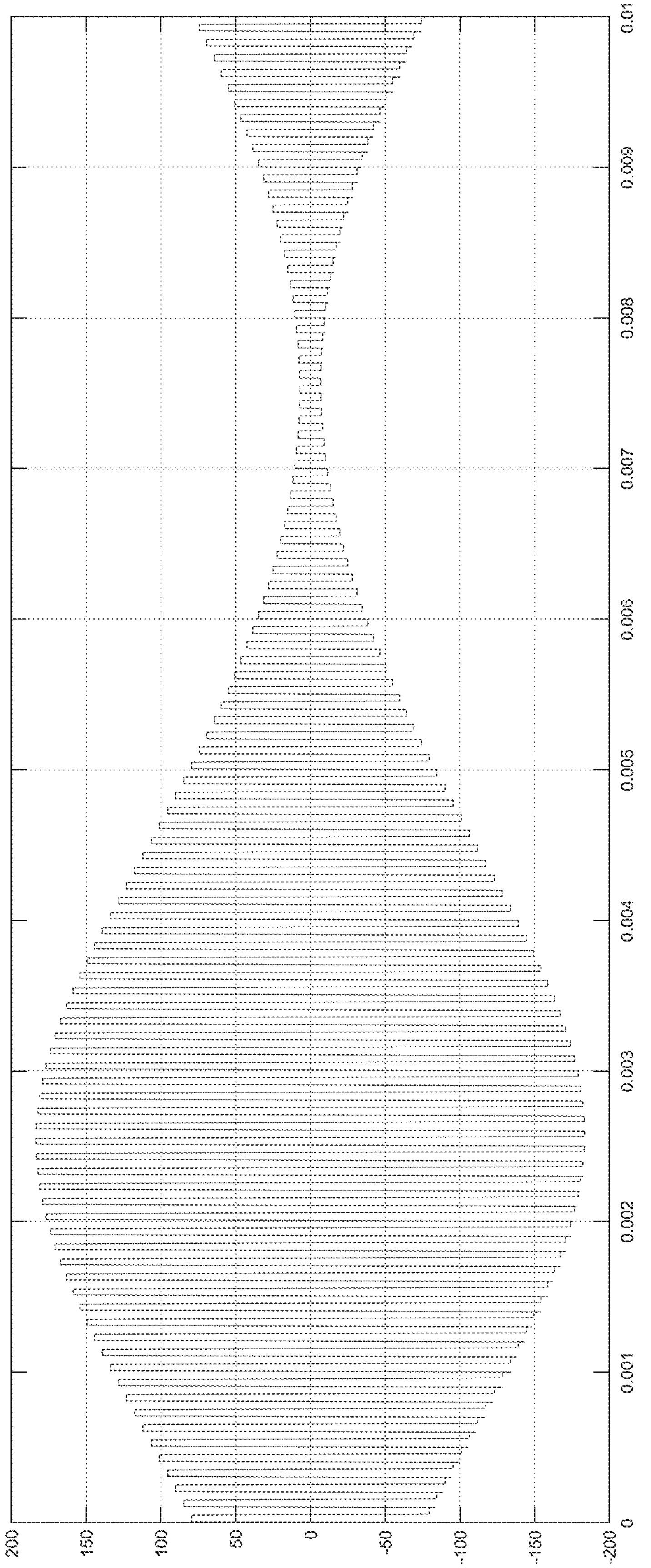
FIG. 4 illustrates a current waveform flowing through the dual active bridge (D-AB) module when transferring a double frequency waveform on a floating direct current side to a low-voltage direct current side by using the pulse width modulation method.

FIG. 4 illustrates a current waveform flowing through the dual active bridge (D-AB) module when transferring a double frequency waveform on the floating direct current side to the low-voltage direct current side by using the pulse width modulation method. As previously mentioned, the double frequency alternating current component in the current $I_{dc}$ on the floating direct current side is $$-\frac{U_f I_m}{2}\cos(2\omega t).$$

If at least a portion of the double frequency alternating current component is transferred to an output end of the dual active bridge module (namely, the low-voltage direct current side) via pulse width modulation, the current flowing through the dual active bridge module, such as the current $I_p$ transferred in the DC-AC module on the primary side, will be in a saddle-shaped form as shown in FIG. 4. Unlike FIG. 3, the amplitude of rectangular fluctuating current formed by high-frequency switching continuously changes instead of being constant, making its envelope close to a trigonometric function curve. The waveform curve is a superposition of the direct current component transferred to the low-voltage direct current side in conventional operation and the newly introduced double frequency alternating current component transferred to the low-voltage direct current side. The current $I_p$ shown in FIG. 4 includes only 90% in the double frequency waveform on the floating direct current side and all of the direct current component. However, the 90% is only an example and not a limitation. The proportion can be selected from 0 to 100% according to the demand, such as not more than 50%, 60%, 70%, 80%, 90%, or 95%. Table 4 and Table 5 show losses on the dual active bridge module caused by 90% of the double frequency current transferred from the floating direct current side to the low-voltage direct current side. Also using 30 KHz as the fundamental frequency, Table 4 shows respective conduction loss, switching loss, and total loss of the DC-AC module on the primary side and the AC-DC module on the secondary side of the dual active bridge module under the condition of 100% load, where the total loss on the primary side is 216.615 watts, the total loss on the secondary side is 220.681 watts, and the total loss added up on the transistors is 437.296 watts.

TABLE 4

| Loss on semiconductor elements in DC-DC power portion (W) | |
|---|---|
| Load | 100% |
| Conduction loss on primary side | 141.133 |
| Switching loss on primary side | 75.482 |
| Total loss on primary side | 216.615 |
| Conduction loss on secondary side | 144.806 |
| Switching loss on secondary side | 75.875 |
| Total loss on secondary side | 220.681 |
| Total loss | 437.296 |

Table 5 shows total losses of the windings of the isolation transformer, caused by the waveforms of five multiple frequency components respectively, namely, the fundamental frequency (30 KHz), triple frequency (90 KHz), quintuple frequency (150 KHz), septuple frequency (210 KHz), and nonuple frequency (270 KHz), and cumulative losses of the five items. It can be seen that the total loss of the windings of the isolation transformer is about 210.08 watts.

TABLE 5

| Winding losses of medium-voltage transformer (W) | | | |
|---|---|---|---|
| Frequency | Resistance (mohm) | Current (A) | Loss (W) |
| 30 KHz − 100 Hz | 19.5 | 38.3 | 170.73 |
| 30 KHz | | 76.4 | |
| 30 KHz + 100 Hz | | 38.1 | |
| 90 KHz − 100 Hz | | 10.5 | |
| 90 KHz | 43.6 | 20.5 | 27.76 |
| 90 KHz + 100 Hz | | 10.3 | |
| 150 KHz − 100 Hz | | 4.2 | |
| 150 KHz | 87.7 | 8 | 8.71 |
| 150 KHz + 100 Hz | | 4.2 | |
| 210 KHz − 100 Hz | | 1.4 | |
| 210 KHz | 152.9 | 3 | 1.98 |
| 210 KHz + 100 Hz | | 1.4 | |
| 270 KHz − 100 Hz | | 0.3 | |
| 270 KHz | 240.5 | 1.9 | 170.73 |
| 270 KHz + 100 Hz | | 0.3 | |
| 30 KHz − 100 Hz | | 38.3 | |
| Total loss (W) | | | 210.08 |

Compared with the scenario of transferring direct current waveforms in the dual active bridge module shown in FIG. 3, once the double frequency waveform on the floating direct current side is superimposed on the direct current waveform and the both are transferred to the low-voltage direct current side, the transistor losses and transformer winding losses in the dual active bridge module significantly increase.

In order to determine sources of the increased losses, the current $I_P$ in the dual active bridge module when 90% (namely, 0.9) of the double frequency waveform is transferred is further Fourier expanded. The current $I_P$ may be represented as a superposition of a square wave power waveform Squarwave and a double frequency waveform:

$$I_P = Squarwave + \frac{U_f I_m}{2}\cos(2\omega t) * Squarwave = \left[1 + \frac{0.9U_f I_m}{2}\cos(2\omega t)\right] \times \frac{4\times 80A}{\pi} \sum_{n=1}^{4} \frac{1}{(2n-1)}\sin[(2n-1)\omega_f t] = \frac{4\times 80A}{\pi}\sum_{n=1}^{4}\frac{1}{(2n-1)}\sin[(2n-1)\omega_f t] + \frac{0.9U_f I_m}{2} \times \frac{4\times 80A}{\pi}\sum_{n=1}^{4}\frac{1}{(2n-1)}\sin[((2n-1)\omega_f \pm 100\text{ Hz})t],$$

wherein the first portion is:

$$\frac{4\times 80A}{\pi}\sum_{n=1}^{4}\frac{1}{(2n-1)}\sin[(2n-1)\omega_f t];$$

the second portion is:

$$\frac{0.9U_f I_m}{2} \times \frac{4\times 80A}{\pi}\sum_{n=1}^{4}\frac{1}{(2n-1)}\sin[((2n-1)\omega_f \pm 100\text{ Hz})t].$$

$I_P$ may be represented as a sum of the first portion and the second portion, where the first portion is a Fourier expansion term of the square wave in the frequency domain, namely, a main band; the second portion is a side band added due to the transfer of the double frequency waveform, and the side band drifts left and right by 100 Hz respectively on each odd multiple frequency component of the square waveform in the frequency domain, namely, the drift is a double frequency (100 Hz) of an alternating current power frequency (50 Hz). Since the total loss can be equivalent to the sum of the loss caused by the first portion and the loss caused by the second portion, it can be inferred that the main source of the losses lies in the second portion representing the side band. The side band is generated from the double frequency waveform on the floating direct current side.

Based on the above analysis, the technical solution of the present application adopts an active control method to reduce or even eliminate the proportion of the above side band current waveform in the current $I_P$ of the dual active bridge. Therefore, when at least a portion of the double frequency on the floating direct current side is transferred to the low-voltage direct current side for elimination, the losses of power electronic devices and transformers can be further controlled to ideal states lower than the values shown in Table 4 and Table 5. Based on this idea, the present application intends to implement a high power density current conversion apparatus with high current quality, energy conservation, low consumption, and greatly reduced capacitance and volume of the capacitor on the floating direct current side.

In order to efficiently eliminate or reduce the double frequency component on the floating direct current side to reduce the specification requirements of the corresponding capacitor, the inventor proposes to, for the three-phase three-wire system, inject a zero sequence component (the zero sequence component refers to a component in a zero sequence symmetrical system after unbalanced power of a three-phase system is decomposed by a symmetrical component method) into the rectifier side of each phase of the cascaded H-bridge current conversion apparatus to cancel the side band on the floating direct current side or reduce its proportion. The most typical example is to inject a triple frequency voltage waveform (the frequency of which is three times the alternating current input power frequency) with a phase angle difference of 120°. As long as the third harmonic of each phase injected into the three-phase three-wire system is controlled at the phase angle difference of 120°, the total sum of third harmonics of three phases at a virtual neutral point is equivalent to 0, which achieves mutual cancellation of the third harmonics injected into the three-phase three-wire system. However, such third harmonic injection is difficult to apply to a three-phase four-wire system because the zero sequence component of the third harmonic (such as the third or ninth component) will generate a path. The following provides three specific embodiments to illustrate the injection method of a zero sequence component. However, the following embodiments are merely examples and not limitations to the present application.

Embodiment 1

In this embodiment, in the three-phase three-wire cascaded H-bridge power conversion apparatus shown in FIG. 1, a triple frequency voltage harmonic with equal phase angle and amplitude is injected into each stage of H-bridge module of each phase, and the voltage harmonics between the three phases are staggered by 120°, so all the injected triple frequency voltage harmonics cancel each other. Notably, in a single-phase cascaded H-bridge power conversion apparatus, it is necessary to avoid injecting a triple frequency voltage harmonic of a first phase angle into one stage and injecting another triple frequency voltage harmonic of an opposite phase angle into another stage to cancel the triple frequency voltage harmonic. Although this can avoid artificially generated harmonic pollution on the alternating current input grid side, the double frequency voltage component in the power conversion process of the dual active bridge cannot be reduced, but may increase instead.

In addition to satisfying the phase angle constraint between the three phases, injecting the voltage waveform into the cascaded H-bridge module of each phase will result in the following waveform superposition mechanism: it is agreed that the triple frequency voltage injected into the full-bridge rectifier module of one stage is the first injection voltage, represented as:

$$U_{inj-3rd}\sin(3\omega t) = U_{3rd}U_{dc}\sin(3\omega t),$$

when the first injection voltage is injected, the voltage of the full-bridge rectifier module is represented as:

$$U_{in} = U'_{in} + U_{inj-3rd}\sin(3\omega t) = U_f U_{dc}\sin(\omega t) + U_{3rd}U_{dc}\sin(3\omega t);$$

The grid input current is represented as:

$$I_g = I_m\sin(\omega t).$$

The power of the current in the full-bridge rectifier module is:

$$P_{in} = I_g U_{in} = U_f U_{dc} I_m \sin^2(\omega t) + I_m U_{3rd} U_{dc}\sin(3\omega t) I_m \sin(\omega t).$$

The current on the floating direct current side is:

$$I_{dc} = P_{in}/U_{dc} = \frac{U_f I_m}{2} - \frac{U_f I_m}{2}\cos(2\omega t) - \frac{I_m U_{3rd}[\cos(4\omega t) - \cos(2\omega t)]}{2} = \frac{U_f I_m}{2} - \frac{(U_f - U_{3rd})I_m}{2}\cos(2\omega t) - \frac{U_{3rd} I_m \cos(4\omega t)}{2}.$$

In the process of calculating $I_{dc}$ using $P_{in}$, the method of changing plus and/or minus into product for trigonometric functions (referred as Sum and Difference to Product Identities) can be used to obtain the above equation. In the equation, the current $I_{dc}$ is represented as a sum of a direct current component $$\frac{U_f I_m}{2},$$

a double frequency component $$-\frac{(U_f - U_{3rd})I_m}{2}\cos(2\omega t),$$

and a quadruple frequency component $$-\frac{U_{3rd}I_m\cos(4\omega t)}{2}.$$

Therefore, by adjusting the amplitude and phase angle of the first injection voltage, $U_f$ and $U_{3rd}$ at least partially cancel each other, so that the total amount of the double frequency component $$-\frac{(U_f - U_{3rd})I_m}{2}\cos(2\omega t)$$

is also at least partially canceled. Although the quadruple frequency component is introduced in the above equation when the first injection voltage of the triple frequency is injected, the energy loss of each power electronic device in the dual active bridge conversion unit caused by the quadruple frequency component is significantly lower than the loss caused by the double frequency component. Therefore, the total energy consumption is theoretically greatly reduced.

However, after the above waveform control principle is theoretically determined, the potential risk of waveform expression distortion (over-modulation) in the full-bridge rectifier module should be further considered. For each stage, the voltage waveform in the full-bridge rectifier module after the expected injected first injection voltage is superposed with the single-phase alternating current input waveform is:

$$U_{in} = U_{dc}(U_f\sin(\omega t) + U_{3rd}\sin(3\omega t)).$$

When positive or negative $U_{dc}$ is used as the amplitude of a triangular wave carrier and $U_{in}$ is used as a reference waveform, the amplitude of the reference waveform should be limited to be not greater than the amplitude of the carrier waveform to ensure that the carrier can accurately approximate the true waveform of the reference wave. Otherwise, once the amplitude of the reference waveform is greater than the amplitude of the carrier waveform, the result of comparison between the two cannot effectively reflect the reference waveform any more, and unexpected fifth and/or seventh harmonics will be generated at the output end of the full-bridge rectifier due to over-modulation. Therefore, the injected first injection voltage needs to satisfy the following first reference wave amplitude constraint:

$$|U_f\sin(\omega t) + U_{3rd}\sin(3\omega t)| \leq 1.$$

Under the constraint, analysis on the current waveform of the full-bridge rectifier module is further required:

if $$A = -(U_f - U_{3rd}), \text{ and } B = -U_{3rd},$$

then $$A + B = -U_f.$$

In this case, $$I_{dc} = \frac{U_fI_m}{2} - \frac{(U_f - U_{3rd})I_m}{2}\cos(2\omega t) - \frac{U_{3rd}I_m\cos(4\omega t)}{2} = \frac{U_fI_m}{2} + A\frac{\cos(2\omega t)I_m}{2} + B\frac{\cos(4\omega t)I_m}{2}.$$

It can be seen that the coefficients A and B should minimize the amplitude of the total current waveform of the second harmonic and the fourth harmonic in the above equation as much as possible. That is, a minimum value of $\sqrt{A^2+B^2}$ is solved under the constraint $A+B=-U_f$. If the coefficients A and B corresponding to the minimum value further satisfy the aforementioned first reference wave amplitude constraint, such coefficients A and B are the best available values; if they do not satisfy, the coefficients A and B should be further calculated according to actual circuit configuration parameters to minimize the amplitude of the total current waveform of the second harmonic and the fourth harmonic in the above equation as much as possible and satisfy the first reference wave amplitude constraint, for example, using an exhaustive method in calculation simulation.

In this embodiment, the value $U_f/2$ of $U_{3rd}$ corresponding to the minimum value of $\sqrt{A^2+B^2}$ satisfies the first reference wave amplitude constraint, so the value of $U_{3rd}$ should be $U_f/2$. The first injection voltage is:

$$U_{inj-3rd}\sin(3\omega t) = U_{3rd}U_{dc}\sin(3\omega t) = \frac{1}{2} * U_fU_{dc}\sin(3\omega t).$$

According to the above calculation result, the loss amount on the dual active bridge module after the triple frequency voltage is injected can be determined by simulation.

Table 6 and Table 7 show energy loss on the dual active bridge module when the triple frequency voltage is injected into the full-bridge rectifier and 90% of the double frequency voltage waveform is transferred by the dual active bridge module from the floating direct current side to the low-voltage direct current side. Using 30 KHz as a fundamental frequency, Table 6 shows respective conduction loss, switching loss, and total loss of the DC-AC module on the primary side and the AC-DC module on the secondary side of the dual active bridge module under the condition of 100% load, where the total loss on the primary side is 178.248 watts, the total loss on the secondary side is 182.083 watts, and the total loss added up on the switch transistors is 360.331 watts, which is significantly reduced from the loss of 437.296 watts when the triple frequency voltage is not injected.

TABLE 6

| Loss on semiconductor elements in DC-DC power portion (W) | |
|---|---|
| Load | 100% |
| Conduction loss on primary side | 111.672 |
| Switching loss on primary side | 66.576 |
| Total loss on primary side | 178.248 |
| Conduction loss on secondary side | 115.299 |
| Switching loss on secondary side | 66.784 |
| Total loss on secondary side | 182.083 |
| Total loss | 360.331 |

Table 7 shows total losses of the windings of the isolation transformer, caused by the waveforms of five multiple frequency components respectively, namely, the fundamental frequency (30 KHz), triple frequency (90 KHz), quintuple frequency (150 KHz), septuple frequency (210 KHz), and nonuple frequency (270 KHz), and cumulative losses of the five items. It can be seen that the total loss of the windings of the isolation transformer is about 171.85 watts, which is also significantly less than the loss 210.08 watts of the windings of the isolation transformer when the triple frequency voltage is not injected.

TABLE 7

Winding losses of medium-voltage transformer

| Frequency | Resistance (mohm) | Current (A) | Loss (W) |
|---|---|---|---|
| 30 KHz − 200 Hz | 19.5 | 17.5 | 127.23 |
| 30 KHz − 100 Hz | | 17.5 | |
| 30 KHz | | 72.8 | |
| 30 KHz + 100 Hz | | 17.5 | |
| 30 KHz + 200 Hz | | 17.5 | |
| 90 KHz − 200 Hz | 43.6 | 5.4 | 26.38 |
| 90 KHz − 100 Hz | | 5.4 | |
| 90 KHz | | 22.1 | |
| 90 KHz + 100 Hz | | 5.4 | |
| 90 KHz + 200 Hz | | 5.4 | |
| 150 KHz − 200 Hz | 87.7 | 2.8 | 11.52 |
| 150 KHz − 100 Hz | | 2.8 | |
| 150 KHz | | 10 | |
| 150 KHz + 100 Hz | | 2.8 | |
| 150 KHz + 200 Hz | | 2.8 | |
| 210 KHz − 200 Hz | 152.9 | 1.4 | 5.66 |
| 210 KHz − 100 Hz | | 1.4 | |
| 210 KHz | | 5.4 | |
| 210 KHz + 100 Hz | | 1.4 | |
| 210 KHz + 200 Hz | | 1.4 | |
| 270 KHz | 240.5 | 2.1 | 1.6 |
| Total loss (W) | | | 171.85 |

Embodiment 2

In this embodiment, in the three-phase three-wire cascaded H-bridge power conversion apparatus shown in FIG. 1, a triple frequency voltage harmonic with equal phase angle and amplitude is injected into each stage of H-bridge module of each phase, and the voltage harmonics between the three phases are staggered by 120° The introduced triple frequency voltage harmonic reduces the side frequency band formed by the double frequency voltage component, but introduces a quadruple frequency voltage component. The quadruple frequency voltage component also produces energy loss which is less than that of the double frequency voltage component but still cannot be ignored. In order to further reduce the energy loss caused by the quadruple frequency voltage component, a second injection voltage of a quintuple frequency needs to be further introduced. A new quadruple frequency component and a new sextuple frequency component are introduced into the voltage $U_{in}$ by the Sum and Difference to Product Identities similar to Embodiment 1, and the total quadruple frequency component is eliminated as much as possible. However, the operation of injecting the quintuple frequency is much more challenging than that of injecting the triple frequency voltage harmonic in Embodiment 1. The triple frequency voltage harmonic injected into the three-phase three-wire system only requires constraint on its phase angle stagger of 120° between three phases. However, the quintuple frequency voltage harmonic does not have such an advantage and cannot achieve cancellation between three phases by phase stagger. It is well known in the art that, if a quintuple frequency voltage component is artificially injected into a power conversion system but cannot be effectively canceled, such harmonic pollution will cause considerable adverse effects when entering an alternating current input grid.

In view of the technical problem, the inventor starts from another direction and analyzes the configuration characteristics of each stage of the three-phase three-wire cascaded H-bridge power conversion apparatus. The cascaded H-bridge power conversion apparatus usually retains at least one redundant stage in hot standby and one bypass stage for bypassing a failed stage. When a stage of H-bridge module in normal operation fails, the redundant stage will replace the failed stage and be used, while the failed stage of H-bridge module will be bypassed by the bypass stage. In such a cascaded H-bridge power conversion apparatus, if the redundant stage is in a hot standby state, the redundant stage can be used to generate the desired second injection voltage for canceling the quadruple frequency voltage. Because the quintuple frequency voltage is artificially injected into the rectifier side, a negative quintuple frequency voltage having an opposite phase but the same amplitude as the second injection voltage needs to be injected into one of the remaining cascaded stages. In order to prevent the negative quintuple frequency voltage from being transferred to the low-voltage direct current side by the dual active bridge module to hinder the effective reduction of the quadruple frequency waveform in each dual active bridge module of the phase by the first injection voltage, a third injection voltage having an opposite phase but a same amplitude as the second injection voltage can be generated by the bypass stage, as the bypass stage does not output any power to the low-voltage direct current side.

Specifically, it is agreed that the triple frequency voltage injected into the full-bridge rectifier module of one stage is the first injection voltage, represented as:

$$U_{inj-3rd}\sin(3\omega t)=U_{3rd}U_{dc}\sin(3\omega t).$$

It is agreed to select one of all n stages of the phase and inject the second injection voltage into its full-bridge rectifier module, which has a quintuple frequency form of alternating current input frequency (fundamental frequency), represented as:

$$U_{inj-5th}\sin(5\omega t)=U_{5th}U_{dc}\sin(5\omega t);$$

wherein, $U_f$ is a conversion coefficient of the full-bridge rectifier module, $U_{dc}$ is a voltage on the floating direct current side, ω is an alternating current input frequency, and $U_{5th}$ is a coefficient to be determined; and a bypass stage that does not participate in power transfer from the floating direct current side to the low-voltage direct current side is selected from all the n stages of the phase, and a third injection waveform having the same amplitude as the second injection voltage but a phase angle difference of 180° is injected into the bypass stage.

When the first injection voltage and the second injection voltage are simultaneously injected into the full-bridge rectifier module of one stage, $$U_{in} = U'_{in} + U_{inj-3rd}\sin(3\omega t) + U_{inj-5th}\sin(5\omega t) = U_f U_{dc}\sin(\omega t) + U_{3rd}U_{dc}\sin(3\omega t) + U_{5th}U_{dc}\sin(5\omega t),$$

the grid current of the phase is:

$$I_g = I_m\sin(\omega t);$$

the power of the current in the full-bridge rectifier module is:

$$P_{in} = I_g U_{in} = U_f U_{dc} I_m \sin^2(\omega t) + I_m U_{3rd} U_{dc}\sin(3\omega t) I_m \sin(\omega t) + I_m U_{5th} U_{dc}\sin(5\omega t) I_m \sin(\omega t);$$

then, the current on the floating direct current side is represented by the Sum and Difference to Product Identities as:

$$I_{dc} = P_{in}/U_{dc} = \frac{U_f I_m}{2} - \frac{U_f I_m}{2}\cos(2\omega t) - \frac{I_m U_{3rd}[\cos(4\omega t) - \cos(2\omega t)]}{2} - \frac{I_m U_{5th}[\cos(6\omega t) - \cos(4\omega t)]}{2} = \frac{U_f I_m}{2} - \frac{(U_f - U_{3rd}) I_m}{2}\cos(2\omega t) - \frac{(U_{3rd} - U_{5th}) I_m \cos(4\omega t)}{2} - \frac{I_m U_{5th}\cos(6\omega t)}{2};$$

it can be rewritten as:

$$I_{dc} = \frac{U_f I_m}{2} + A\frac{\cos(2\omega t) I_m}{2} + B\frac{\cos(4\omega t) I_m}{2} + C\frac{\cos(6\omega t) I_m}{2};$$

wherein, $A=-(U_f-U_{3rd})$, $B=-(U_{3rd}-U_{5th})$, and $C=-U_{5th}$, so $A.+B+C=-U_f$.

In order to avoid partial distortion of the corresponding reference waveform generated by pulse width modulation due to over-modulation, a second reference wave amplitude constraint should be satisfied:

$$U_f\sin(\omega t) + U_{3rd}\sin(3\omega t) + U_{5th}\sin(5\omega t) \le 1.$$

The first and second injection voltages are configured to minimize $\sqrt{A^2+B^2+C^2}$, so as to reduce waveform distortion of the full-bridge rectifier module when the first and the second injection voltages are injected. Similar to Embodiment 1, if the coefficients A, B, and C corresponding to the minimum value further satisfy the aforementioned second reference wave amplitude constraint, such coefficients A, B, and C are the best available values; if they do not satisfy, the coefficients A, B, and C should be further calculated according to actual circuit configuration parameters to minimize the amplitude of the total current waveform of the second harmonic and the fourth harmonic in the above equation as much as possible and to satisfy the second reference wave amplitude constraint, for example, using an exhaustive method in calculation simulation.

Embodiment 3

For a three-phase three-wire cascaded H-bridge power conversion apparatus, the total number of stages is assumed to be n, where two are redundant stages, one is a bypass stage, and the number of normal working stages is n−3. Because the redundant stages and the bypass stage are used less frequently than the remaining normal working stages, the remaining normal working stages are usually replaced after durable years. However, after power electronic devices are replaced with new ones in the remaining relatively normal working stages, power electronic devices in the redundant stages and the bypass stage have relatively short service lives, and will be damaged earlier than the other power electronic devices after replacement at a high probability. In order to avoid such a buckets effect, in another technical solution of the present invention to transfer a second harmonic on the floating direct current side to the low-voltage direct current side, a feasible method includes injecting only a third harmonic to other stages after replacing the other stages except for the redundant stages to reduce the loss of the second harmonic in the dual active bridge module of that stage, injecting third and fifth harmonics into the redundant stages in which power electronic devices are relatively aged to reduce the losses of the second and fourth harmonics in the dual active bridge module of that stage, and introducing, only in the redundant stages, a sixth harmonic that significantly reduces the contribution to losses. Therefore, the temperature of the redundant stages is lower than that of the other stages, which can effectively keep the degrees of subsequent aging of the remaining stages with updated power electronic devices and the redundant stages with relatively aged power electronic devices closer, and avoid as much as possible the failure of the entire system due to early scrapping of the redundant stages that account for a small proportion in the total stages.

Although the present invention is described through preferred embodiments, the present invention is not limited to the embodiments described herein, but further includes various changes and variations made without departing from the scope of the present invention

Terminology

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may include, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A method for controlling a three-phase three-wire cascaded H-bridge power conversion apparatus, the cascaded H-bridge power conversion apparatus having a plurality of stages with a same structure, each stage comprising a full-bridge rectifier module, a floating direct current side, a dual active bridge converter, and a low-voltage direct current side connected in sequence, wherein a capacitor is connected in parallel to the floating direct current side, the full-bridge rectifier module rectifies an alternating current input voltage with a fundamental frequency into a direct current voltage and outputs the direct current voltage to the floating direct current side, and the dual active bridge converter receives and converts the direct current voltage and outputs the converted voltage to the low-voltage direct current side, wherein the method comprises:

calculating a first current output from the full-bridge rectifier module to the floating direct current side when the dual active bridge converter performs direct current-direct current conversion, the first current being composed of a first current direct current component and a first current double frequency component; and generating a first injection voltage with a triple frequency of the fundamental frequency, so as to inject the first injection voltage into the floating direct current side, and transferring at least a portion of the first current double frequency component to the low-voltage direct current side, wherein a total current on the floating direct current side is composed of the first current and a second current after the first injection voltage is injected, wherein the second current is composed of a second current double frequency component and a second current quadruple frequency component, and wherein an amplitude and phase angle of the first injection voltage are configured so that the first current double frequency component and the second current double frequency component are at least partially canceled.

2. The method of claim 1, wherein, when the first injection voltage is not injected, the voltage of the full-bridge rectifier module is represented as a product of a conversion coefficient and a sine of an alternating current input frequency, and wherein the first injection voltage is represented as a voltage component with a triple frequency of the fundamental frequency, such that, when the first injection voltage is injected, the voltage of the full-bridge rectifier module is a sum of an initial voltage and the triple frequency component, and wherein the amplitude of the first injection voltage is configured to satisfy an amplitude constraint to avoid waveform distortion of the full-bridge rectifier module.

3. The method of claim 2, wherein a single-phase alternating current input current is represented as a sine wave, and the total current on the floating direct current side when the first injection voltage is injected comprises a direct current component, a double frequency component, and a quadruple frequency component, and wherein the amplitude of the first injection voltage is configured to minimize a combined amplitude of the double frequency component and the quadruple frequency component while satisfying a first reference wave amplitude constraint.

4. The method of claim 2, wherein the first injection voltage is configured to satisfy a condition that the amplitude of the triple frequency component is equal to half the amplitude of the conversion coefficient of the full-bridge rectifier module.

5. The method of claim 1, wherein each phase of the three-phase three-wire cascaded H-bridge power conversion apparatus comprises at least one bypass stage and one redundant stage, and wherein the method further comprises:

for each phase, generating, in addition to the first injection voltage, a second injection voltage with a quintuple frequency of the fundamental frequency and a third injection voltage with the same frequency but opposite phase as the second injection voltage;

controlling the full-bridge rectifier module to superimpose the second injection voltage, the alternating current input voltage, and the first injection voltage and output the superimposed voltage to the floating direct current side of the redundant stage, wherein the total current on the floating direct current side is composed of the first current, the second current, and a third current after the first and second injection voltages are injected, wherein the third current is composed of a third current quadruple frequency component and a third current sextuple frequency component, and wherein the amplitude and phase angle of the second injection voltage are configured so that the second current quadruple frequency component and the third current quadruple frequency component are at least partially canceled; and controlling the full-bridge rectifier module to inject the third injection voltage into the floating direct current side of the bypass stage.

6. The method of claim 5, wherein, when the first injection voltage is not injected, the voltage of the full-bridge rectifier module is represented as a product of a conversion coefficient and a sine of an alternating current input frequency, and wherein the first injection voltage is represented as a voltage component with a triple frequency of the fundamental frequency, and the second injection voltage is represented as a voltage component with a quintuple frequency of the fundamental frequency, wherein the amplitudes of the first and second injection voltages are configured to satisfy a second reference wave amplitude constraint to reduce waveform distortion of the full-bridge rectifier module when injecting the first and second injection voltages.

7. The method of claim 6, wherein a single-phase alternating current input current is represented as a sine wave, and the total current on the floating direct current side when the first injection voltage is injected is represented as a sum of a direct current component, a double frequency component, a quadruple frequency component, and a sextuple frequency component, wherein the amplitudes of the first and second injection voltages are configured to minimize a combined amplitude of the double frequency, quadruple frequency, and sextuple frequency components while satisfying the second reference wave amplitude constraint.

8. The method of claim 1, wherein at least one of three phases of the cascaded H-bridge power conversion apparatus comprises a redundant stage, and the method further comprises after replacing other stages except for the redundant stage, controlling the redundant stage to inject injection voltages with triple and quintuple frequencies of the alternating current input, and controlling the other stages to inject the injection voltage with the triple frequency of the alternating current input.

9. The method of claim 1, wherein at least 90% of the first current double frequency component is transferred to the low-voltage direct current side by the dual active bridge converter; or all of the first current double frequency component is transferred to the low-voltage direct current side by the dual active bridge converter, so that only the direct current component is retained on the floating direct current side.

10. The method of claim 1, wherein the amplitude and phase angle of the first injection voltage are configured so that all the first and second double frequency current components are canceled.

11. A method for suppressing harmonics in a three-phase three-wire cascaded H-bridge power conversion apparatus, the apparatus comprising a plurality of stages, each stage including a full-bridge rectifier module, a floating direct current side, and a dual active bridge converter, the method comprising:

calculating a first current output from the full-bridge rectifier module to the floating direct current side, the first current comprising a direct current component and a double frequency component;

generating a first injection voltage with a triple frequency of a fundamental frequency;

injecting the first injection voltage into the floating direct current side to transfer at least a portion of the double frequency component to a low-voltage direct current side; and configuring an amplitude and phase angle of the first injection voltage to at least partially cancel the double frequency component on the floating direct current side.

12. The method of claim 11, further comprising generating a second injection voltage with a quintuple frequency of the fundamental frequency, and injecting the second injection voltage into the floating direct current side, wherein the amplitude and phase angle of the second injection voltage are configured to at least partially cancel a quadruple frequency component on the floating direct current side.

13. The method of claim 11, wherein the first injection voltage is configured such that the amplitude of the first injection voltage satisfies a first reference wave amplitude constraint to avoid waveform distortion of the full-bridge rectifier module when injecting the first injection voltage.

14. The method of claim 11, wherein each phase of the cascaded H-bridge power conversion apparatus further comprises a redundant stage and a bypass stage, and the method further comprises:

injecting the first injection voltage into the full-bridge rectifier modules of all stages except for the redundant stage, injecting both the first and second injection voltages into the full-bridge rectifier module of the redundant stage, and injecting a third injection voltage into the full-bridge rectifier module of the bypass stage, wherein the bypass stage does not participate in a direct current-direct current conversion from the floating direct current side to the low-voltage direct current side.

15. A three-phase three-wire cascaded H-bridge power conversion apparatus for harmonic suppression, comprising:

a plurality of stages, each stage including:

a full-bridge rectifier module configured to receive an alternating current input voltage and rectify it into a direct current voltage output, a floating direct current side configured to receive the direct current voltage output from the full-bridge rectifier module, and a dual active bridge converter configured to receive the direct current voltage from the floating direct current side and convert it to a low-voltage direct current output;

an injection voltage generator configured to generate a first injection voltage with a triple frequency of a fundamental frequency; and a controller configured to:

calculate a first current output from the full-bridge rectifier module to the floating direct current side, the first current comprising a direct current component and a double frequency component, inject the first injection voltage into the floating direct current side to transfer at least a portion of the double frequency component to a low-voltage direct current side, and configure an amplitude and phase angle of the first injection voltage to at least partially cancel the double frequency component on the floating direct current side.

16. The apparatus of claim 15, wherein the controller is further configured to generate a second injection voltage with a quintuple frequency of the fundamental frequency and inject the second injection voltage into the floating direct current side.

17. The apparatus of claim 16, wherein the amplitude and phase angle of the second injection voltage are configured to at least partially cancel a quadruple frequency component on the floating direct current side.

18. The apparatus of claim 15, wherein the first injection voltage is configured such that the amplitude of the first injection voltage satisfies a reference wave amplitude constraint to avoid waveform distortion of the full-bridge rectifier module when injecting the first injection voltage.

19. The apparatus of claim 15, wherein the controller is further configured to minimize a total harmonic distortion on the floating direct current side by adjusting the amplitude and phase angle of the first injection voltage.

20. The apparatus of claim 15, wherein each phase of the apparatus further comprises a redundant stage and a bypass stage, and the controller is configured to:

inject the first injection voltage into the full-bridge rectifier modules of all stages except for the redundant stage, inject both the first and second injection voltages into the full-bridge rectifier module of the redundant stage, and inject a third injection voltage into the full-bridge rectifier module of the bypass stage, wherein the bypass stage does not participate in a direct current-direct current conversion from the floating direct current side to the low-voltage direct current side.

* * * * *